Figure 3:
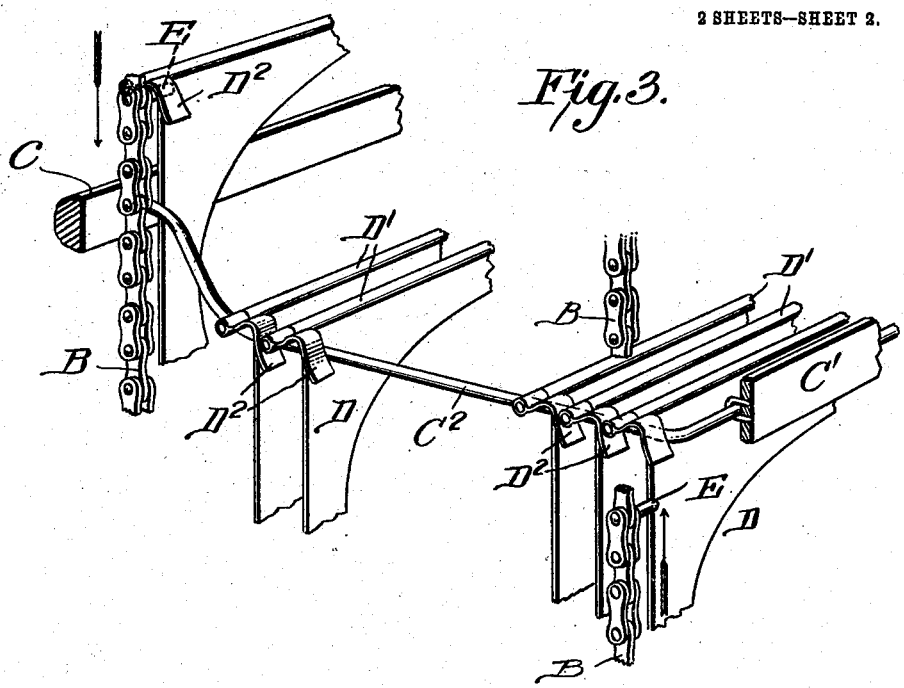

W. F. GILL & J. M. BARRY.
ADVERTISING DEVICE.
APPLICATION FILED APR. 2, 1907.
901,166.
Patented Oct. 13, 1908.
2 SHEETS—SHEET 1.
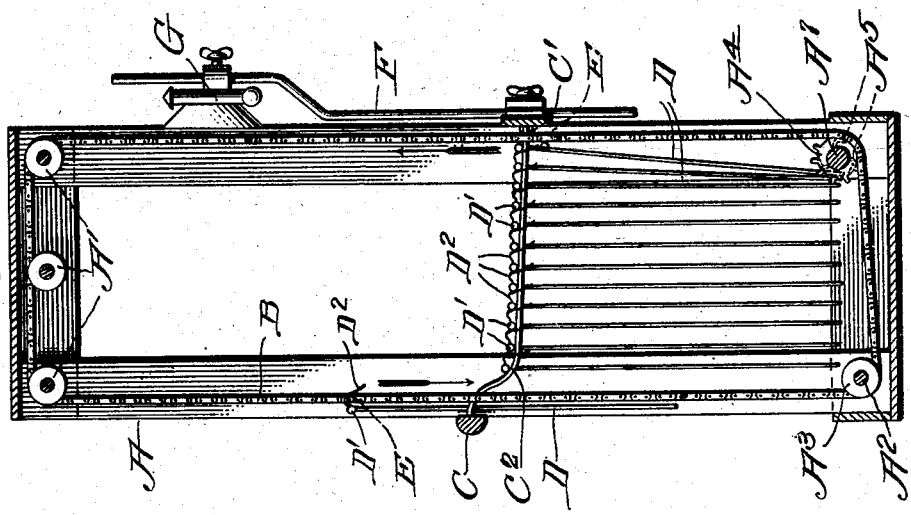
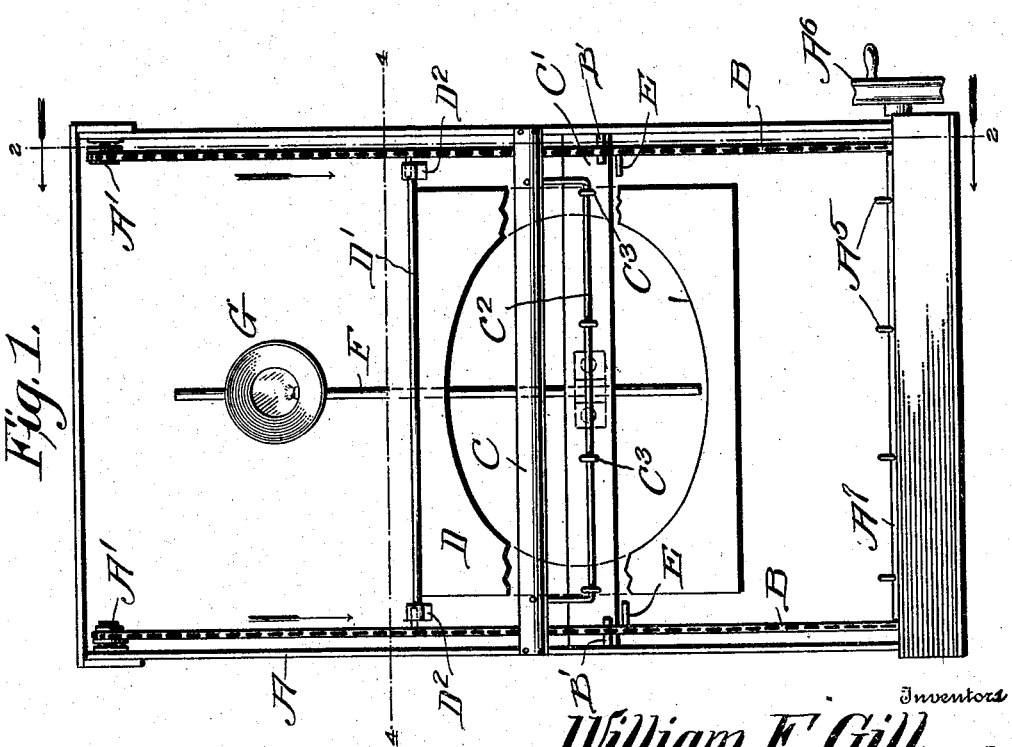

W. F. GILL & J. M. BARRY.
ADVERTISING DEVICE.
APPLICATION FILED APR. 2, 1907.

901,166.

Patented Oct. 13, 1908.

2 SHEETS—SHEET 2.

UNITED STATES PATENT OFFICE.

WILLIAM F. GILL AND JOHN M. BARRY, OF BROOKLYN, NEW YORK, ASSIGNORS OF ONE-THIRD TO SAID JOHN M. BARRY, OF BROOKLYN, NEW YORK, AND TWO-THIRDS TO RICHARD W. BELL, OF EAST LIVERPOOL, OHIO.

ADVERTISING DEVICE.

No. 901,166.      Specification of Letters Patent.      Patented Oct. 13, 1908.

Application filed April 2, 1907. Serial No. 365,933.

*To all whom it may concern:*

Be it known that we, WILLIAM F. GILL and JOHN M. BARRY, citizens of the United States, residing at Brooklyn, in the borough of Brooklyn, in the State of New York, have invented a new and useful Improvement in Advertising Devices, of which the following is a specification.

This invention relates to an advertising device designed to display successively a series of pictures provided with advertising matter and these pictures are carried by frames or mats and may be displayed either by daylight or at night by an artificial light, preferably placed back of the picture the picture being placed together with the advertising matter upon some translucent material, the mat or frame being centrally cut out.

The device is also adapted to show pictures by daylight upon each side by simply placing pictures upon each side of the frame or mat, in which case the pictures and advertising matter are placed back to back.

While pictures are exhibited by artificial light thrown upon the back of the picture, it will be obvious that they would be visible only upon one side of the device, and in order that the same machine may be used for both daylight and night exhibitions, we provide detachable, removable frames so that a frame having two pictures back to back can be employed during the day time, or in fact, at any time when the light is thrown upon the front of the pictures, and frames carrying a single picture, can be introduced where the light is to be thrown upon the back of the picture.

The main object of the invention is to provide a simple means whereby the frames carrying the pictures are brought into view, held in view a predetermined length of time and then removed and another picture with suitable advertising matter substituted for the one withdrawn.

The invention consists of a casing within which an endless carrier travels, the carrier passing vertically up one face of the casing and downwardly upon the opposite face, a frame being carried by the casing which supports the mats holding the pictures, said frame being inclined from one side of the casing to the other so that the mats will travel by gravity to the front of the casing, and means are carried by the conveyer, for successively picking up the mats, lifting them into view and then carrying them back to the upper portion of the inclined frame and depositing them in the order in which they were picked up, the carrier continuing this movement as long as the machine is operated.

Figure 4:
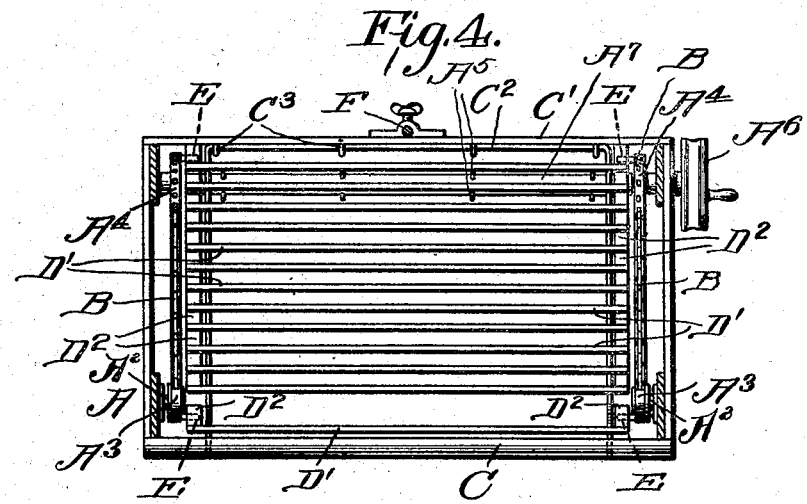

In the drawings forming a part of this specification:—Figure 1 is a front view of the casing, one mat only being shown and a portion of this mat being broken away to more clearly show parts behind it. Fig. 2 is a section on the line 2—2 of Fig. 1. Fig. 3 is a detailed perspective view of a portion of the mat supporting frame, showing portions of the carrier and also corner portions of a number of mats, in various positions. Fig. 4 is a section on the line 4—4 of Fig. 1.

In constructing this invention we employ a rectangular casing A in the upper portion of which the rollers $A'$ are mounted upon opposite sides of the casing and in the lower portion stub shafts $A^2$ are journaled which carry rollers $A^3$ and a shaft $A^7$ which carries sprocket wheels $A^4$. The shaft $A^7$ extends across the casing and carries curved agitator fingers $A^5$, and the projecting end portion of this shaft is provided with a hand wheel $A^6$ which is also grooved so that it may be driven by a belt from any suitable source of power. Running over the rollers $A'$, and $A^3$ and also the sprocket wheels $A^4$ are suitable sprocket chains B. These chains are two in number one traveling adjacent each side of a casing A.

To support suitable advertising matter when disengaged from the carriers B, we secure to the front of the casing A a bar C and to the rear the bar $C'$ and the wire frame $C^2$ extends from the front to the rear bar. This frame $C^2$ has parallel side members and is preferably U-shaped, the bow portion being held to the bar $C'$ by suitable staples $C^3$ while the free ends of the side members are inserted in the bar C. These side members adjacent the bar C curve abruptly downward for a short distance and then incline gently downwardly to their yoke or bow portion.

The mats D are the kind usually employed in connection with framed pictures, being centrally cut out and the upper edges of the mats are secured in any suitable manner to the sticks. These sticks project beyond the ends of the mats D and upon the projecting end portions are secured hooks D², each hook consisting of a metal sleeve which fits over the end of a stick and of a compound curved body portion, said hook opening downwardly. The mats are supported within the U-shaped frame C² by the projecting end portions of the sticks resting upon the side members of said frame, the sticks projecting beyond the sides of the frame and the hooks D² being carried by the extreme end portions of the sticks and being therefore, upon the outside of the frame C². The carrier chains B are provided at suitable intervals with inwardly extending pins E, which pins are adapted as the chains pass upwardly to enter into engagement with the hooks D².

To the cross-bar C' upon the rear side of the frame I clamp a lamp bracket F, upon the upper end portion of which is adjustably mounted a lamp G provided with a suitable reflector and of any desired type.

The lamp will only be necessary when the device is used after dark or in a room where artificial light is necessary. By removing the lamp and placing the device where both its rear and front faces can be seen the pictures may be observed from either the front or rear, it being understood that the mats are each provided with two pictures placed back to back. When the device is used with the lamp G in place it will be convenient to exhibit only those pictures carried by the mats which can be observed from the front since the lamp and its reflector would obstruct the view of the other pictures.

The operation of the device is as follows:—
The carrier B travels upwardly upon the rear side of the casing and downwardly upon the front side. The mats with the pictures affixed thereto, are supported by the frame C² and as this frame inclines downwardly toward the rear of the casing the mats will naturally tend to slide to the rear of the casing A. As the carrier travels upwardly a set of pins E, in alinement with each other will engage the hooks D² carried by the opposite ends of the stick supporting the mat adjacent the rear side of the casing and as the carrier continues its upward movement will lift the mat and picture upwardly clear of the frame C² and carry it to the front of the casing, and then move downward with it. During this forward movement of the mat and picture it will be visible through the front of the casing, and if exhibited after night, will be illuminated from the rear by light from the lamp G. As the picture descends at the front of the casing, the mat will pass between the side members of the frame C² and when the ends of the stick engage the sides of such frame they will support the stick thereby releasing the stick and mat from the pins E, said pins continuing downwardly with the carrier, as will be readily understood. In the meantime the succeeding picture has slipped into the place previously occupied by the picture whose removal and carrying to the front has been described, and this succeeding picture will be lifted by the next set of pins E and also conveyed to the front.

To prevent any failure of operation due to non-slipping of the sticks along the sides of the frame C², the small agitator fingers A⁵ are employed. These fingers contact with the lower edges of the rear-most mat and by vibrating or jarring the same, tend to cause it to travel down the frame C² preventing any sticking of the sticks to the said sides.

It will be obvious from the above explanation, that there will be a continuous rotation of the pictures, they being picked up at the rear of the casing lifted into position above the frame and clear of the said frame, moved forwardly to the front of the casing and then moved downwardly and again deposited upon the frame, down which they travel by gravity as the other pictures are picked up and removed.

It will be obvious that if desired an ornamental front can be placed upon the casing A with a suitable window through which to view the pictures and advertising matter. We have omitted such a front piece from the drawings in order to show more clearly the mechanism which would not be changed by the addition of such front plate. It will also be obvious that a back could also be added without in any way changing the construction of any of the parts we have described. In the drawings we have also omitted the showing of pictures or advertising matter upon the frames in order to more clearly illustrate the construction of the essential features of the device, the nature of the pictures being immaterial. Small guide rollers B' are also placed upon the sides of the casing to guide the sprocket chains upon their vertical movement.

Having thus fully described, our invention, what we claim and desire to secure by Letters Patent, is:—

In a device of the kind described a casing, a U-shaped frame having its side members curving abruptly downward and then inclining slightly downwardly and toward the rear side of the casing, a plurality of mats depending from said frame and resting within the frame, and means for successively lifting said mats from the rear end of the frame, bringing them forward in a horizontal plane above the frame and returning them to the front of the frame, as and for the purpose set forth.

WILLIAM F. GILL.
JOHN M. BARRY.

Witnesses:
WILLIAM H. REILLY,
BENJAMIN BLUME.